United States Patent
Hirayama

(10) Patent No.: US 10,214,637 B2
(45) Date of Patent: *Feb. 26, 2019

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventor: Michio Hirayama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/374,298

(22) PCT Filed: Feb. 21, 2013

(86) PCT No.: PCT/JP2013/054262
§ 371 (c)(1),
(2) Date: Jul. 24, 2014

(87) PCT Pub. No.: WO2013/125614
PCT Pub. Date: Aug. 29, 2013

(65) Prior Publication Data
US 2014/0371372 A1  Dec. 18, 2014

(30) Foreign Application Priority Data
Feb. 22, 2012  (JP) .................. 2012-036761

(51) Int. Cl.
| | |
|---|---|
| C08L 9/06 | (2006.01) |
| C08L 9/00 | (2006.01) |
| C08L 15/00 | (2006.01) |
| B60C 1/00 | (2006.01) |
| C08C 19/44 | (2006.01) |
| C08K 3/36 | (2006.01) |

(52) U.S. Cl.
CPC .............. *C08L 9/06* (2013.01); *B60C 1/0016* (2013.01); *C08C 19/44* (2013.01); *C08K 3/36* (2013.01); *C08L 9/00* (2013.01); *C08L 15/00* (2013.01); *C08K 2201/006* (2013.01); *C08L 2205/02* (2013.01); *Y02T 10/862* (2013.01)

(58) Field of Classification Search
CPC .... C08L 15/00; C08L 9/00; C08L 9/06; C08L 2205/02; C08K 3/36; C08K 2201/006; B60C 1/0016; C08C 19/44
USPC ................................. 524/100, 493
See application file for complete search history.

(56) References Cited

U.S. PATENT DOCUMENTS

| | | | |
|---|---|---|---|
| 5,189,109 A | 2/1993 | Imai et al. | |
| 5,219,938 A | 6/1993 | Imai et al. | |
| 5,902,856 A * | 5/1999 | Suzuki | C08C 19/42 |
| | | | 525/236 |
| 8,865,836 B2 | 10/2014 | Hirayama | |
| 2006/0004143 A1 | 1/2006 | Inagaki et al. | |
| 2010/0048806 A1 | 2/2010 | Inagaki et al. | |
| 2010/0056710 A1 | 3/2010 | Oshima | |
| 2011/0136961 A1 | 6/2011 | Hattori et al. | |
| 2011/0136962 A1* | 6/2011 | Hattori | B60C 1/0016 |
| | | | 524/493 |
| 2011/0230613 A1 | 9/2011 | Hiro | |
| 2011/0245370 A1 | 10/2011 | Uesaka et al. | |
| 2011/0245398 A1 | 10/2011 | Hama et al. | |
| 2013/0012660 A1 | 1/2013 | Hirayama | |
| 2013/0018151 A1 | 1/2013 | Maeda et al. | |
| 2013/0303679 A1 | 11/2013 | Kunisawa et al. | |

FOREIGN PATENT DOCUMENTS

| | | |
|---|---|---|
| CN | 1706874 A | 12/2005 |
| CN | 101659729 A | 3/2010 |
| CN | 101659731 A | 3/2010 |
| CN | 101724185 A | 6/2010 |
| CN | 102093602 A | 6/2011 |
| CN | 102212218 A | 10/2011 |
| EP | 0 334 042 A2 | 9/1989 |
| JP | 1-217047 A | 8/1989 |
| JP | 1-284504 A | 11/1989 |
| JP | 2002-201307 A | 7/2002 |
| JP | 2005-255946 A | 8/2005 |
| JP | 2005-344039 A | 12/2005 |
| JP | 2007-112994 A | 5/2007 |
| JP | 2008-31244 A | 2/2008 |
| JP | 2010-77415 A | 6/2010 |
| JP | 2010-126656 A | 6/2010 |
| JP | 2011-225809 A | 11/2011 |
| JP | 2013-18813 A | 1/2013 |
| JP | 2013-32497 A | 2/2013 |
| JP | 2013-36032 A | 2/2013 |
| WO | WO 2012/128320 A1 | 9/2012 |

OTHER PUBLICATIONS

International Search Report dated Apr. 16, 2013, in PCT International Application No. PCT/JP2012/082802.

* cited by examiner

*Primary Examiner* — Josephine L Chang

(74) *Attorney, Agent, or Firm* — Birch, Stewart, Kolasch & Birch, LLP

(57) ABSTRACT

A rubber composition for tires which enables a balanced improvement in rolling resistance, abrasion resistance, and wet-skid performance which contains a rubber blend, including a diene rubber A modified with a specific acrylamide compound, and a diene rubber B modified with either a combination of a specific silicon or tin compound and a specific modifying compound or with the modifying compound, the combined rubbers A and B having a weight average molecular weight of 300,000 to 1,400,000; and a specific silica.

5 Claims, No Drawings

TIRE RUBBER COMPOSITION AND PNEUMATIC TIRE

TECHNICAL FIELD

The present invention relates to a rubber composition for tires, and a pneumatic tire including the rubber composition.

BACKGROUND ART

Pneumatic tires for automobiles these days are required to have fuel economy (rolling resistance properties) as well as a wide variety of properties including abrasion resistance and wet-skid performance in the tread portion. Various methods have been devised to improve these properties. Especially, the recent strong demand for better fuel economy has led to a trend to use silica as reinforcing filler in rubber compositions for tires. However, silica has hydrophilic silanol groups on the surface and thus has a lower affinity for rubber than carbon black. Accordingly, its use often results in poor abrasion resistance and mechanical strength.

The use of a silane coupling agent or highly reinforcing fine particle silica may be considered to solve the above problems. Fine particle silica, however, is generally very difficult to disperse in rubber compositions and therefore cannot be dispersed well but leaves agglomerates, which makes it impossible to improve abrasion resistance and mechanical strength so much, or rather may deteriorate these properties.

Patent Literature 1, for example, discloses a rubber composition for treads which contains spherical fine particles of amorphous silica as filler and which has improved wet-skid performance without deteriorating rolling resistance and abrasion resistance. This rubber composition, however, still has room for improvement in terms of achieving a balanced improvement in these properties.

CITATION LIST

Patent Literature

Patent Literature 1: JP 2008-31244 A

SUMMARY OF INVENTION

Technical Problem

The present invention aims to provide a rubber composition for tires which can solve the above problems and enable a balanced improvement in rolling resistance, abrasion resistance, and wet-skid performance, as well as a pneumatic tire including the rubber composition.

Solution to Problem

The present invention relates to a rubber composition for tires, including a diene rubber A modified with an acrylamide compound represented by Formula (I):

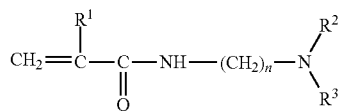

wherein $R^1$ represents hydrogen or a methyl group; $R^2$ and $R^3$ each represent an alkyl group; and n represents an integer, and a diene rubber B modified with either a combination of a silicon or tin compound represented by Formula (II) and a modifying compound represented by Formula (III) or with a modifying compound represented by Formula (III):

wherein R represents an alkyl, alkenyl, cycloalkenyl, or aromatic hydrocarbon group; M represents silicon or tin; X represents a halogen; a represents an integer of 0 to 2; and b represents an integer of 2 to 4,

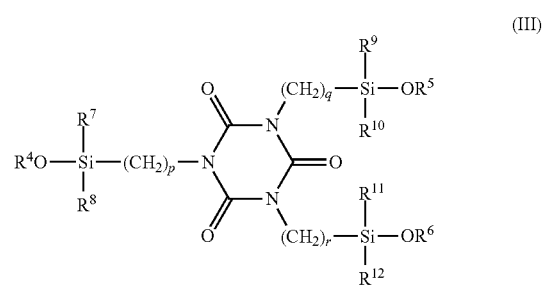

wherein $R^4$ to $R^6$ are the same as or different from one another, each representing a C1 to C8 alkyl group; $R^7$ to $R^{12}$ are the same as or different from one another, each representing a C1 to C8 alkoxy or alkyl group; and p to r are the same as or different from one another, each representing an integer of 1 to 8, the combined modified diene rubbers A and B having a weight average molecular weight of 300,000 to 1,400,000, and the rubber composition further including silica having a CTAB specific surface area of 180 m²/g or more and a BET specific surface area of 185 m²/g or more.

The modified diene rubbers A and B may suitably be provided as a mixture obtained by reacting an active alkali metal-terminated conjugated diene polymer with the acrylamide compound and with either a combination of the silicon or tin compound and the modifying compound or the modifying compound, the active alkali metal-terminated conjugated diene polymer being obtained by polymerizing a conjugated diene monomer alone or a combination of a conjugated diene monomer and an aromatic vinyl monomer in a hydrocarbon solvent in the presence of an alkali metal catalyst.

Preferably, in the modifying compound, $R^4$ to $R^6$ each are a methyl, ethyl, propyl, or butyl group; $R^7$ to $R^{12}$ each are a methoxy, ethoxy, propoxy, or butoxy group; and p to r each are an integer of 2 to 5.

The present invention also relates to a pneumatic tire, including a tread formed from the rubber composition.

Advantageous Effects of Invention

The rubber composition for tires of the present invention includes a diene rubber A terminally modified with a specific acrylamide compound, and a diene rubber B modified with either a combination of a silicon or tin compound and a specific modifying compound or with the modifying compound, wherein the combined rubbers A and B have a weight average molecular weight falling within a specific range; moreover, the rubber composition further includes fine particle silica having a specific CTAB specific surface area and BET specific surface area. Thus, such a composition enables a balanced improvement in rolling resistance, abrasion resistance, and wet-skid performance.

DESCRIPTION OF EMBODIMENTS

The rubber composition for tires of the present invention contains a rubber component that is a blend of later-described modified diene rubbers A and B having as a whole a weight average molecular weight falling within a specific range, in combination with a reinforcing filler that is later-described fine particle silica having a specific CTAB specific surface area and a specific BET specific surface area. Thus, such a composition can perform at high levels of both rolling resistance and abrasion resistance while achieving excellent wet-skid performance, thus remarkably improving the balance of these properties.

This improvement effect is presumably provided by the following functions.

The blend of the modified diene rubbers A and B in the present invention has a strong interaction with both the fillers, carbon black and silica, without forming a covalent bond with the fillers. The use of the rubber A terminally modified with the acrylamide compound can increase the interaction with silica and carbon black. The rubber A when used alone, however, cannot be expected to be effective in breaking filler agglomerates because the proportion of low molecular weight components is large. In such a case, filler dispersibility is difficult to enhance. In contrast, in the present invention, since the rubber B terminally modified with the modifying compound is further used, the interaction with filler, especially with silica, can be further enhanced. In addition, the modified terminal groups of the molecules of the rubber B interact with each other, while maintaining the interaction with silica, so that the polymers are coupled to provide a higher molecular weight. Thus, filler agglomerates can be sufficiently broken, and therefore the rubbers A and B efficiently and synergistically achieve the effect of enhancing filler dispersibility. Moreover, fine particle silica is generally difficult to disperse and thus cannot provide the desired performance improving effect. In the present invention, however, the use of such silica in combination with the aforementioned blend enables the silica to disperse well, leading to a high level of improvement in wet-skid performance and abrasion resistance, and even rolling resistance. These effects presumably improve the property balance efficiently and synergistically, thus allowing providing high-performance tires.

The rubber composition of the present invention contains modified diene rubbers A and B, and the combined rubbers A and B have a weight average molecular weight falling within a specific range.

The modified diene rubber A is a diene rubber modified with an acrylamide compound represented by Formula (I):

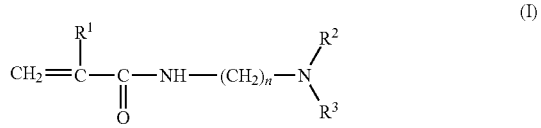

(I)

wherein $R^1$ represents hydrogen or a methyl group; $R^2$ and $R^3$ each represent an alkyl group; and n represents an integer. This modified diene rubber A has a polymer end modified with the acrylamide compound.

In Formula (I), $R^2$ and $R^3$ each are preferably a C1 to C4 alkyl group, and n is preferably an integer of 2 to 5.

Specific examples of the acrylamide compound include N,N-dimethylaminomethylacrylamide, N,N-ethylmethylaminomethylacrylamide, N,N-diethylaminomethylacrylamide, N,N-ethylpropylaminomethylacrylamide, N,N-dipropylaminomethylacrylamide, N,N-butylpropylaminomethylacrylamide, N,N-dibutylaminomethylacrylamide, N,N-dimethylaminoethylacrylamide, N,N-ethylmethylaminoethylacrylamide, N,N-diethylaminoethylacrylamide, N,N-ethylpropylaminoethylacrylamide, N,N-dipropylaminoethylacrylamide, N,N-butylpropylaminoethylacrylamide, N,N-dibutylaminoethylacrylamide, N,N-dimethylaminopropylacrylamide, N,N-ethylmethylaminopropylacrylamide, N,N-diethylaminopropylacrylamide, N,N-ethylpropylaminopropylacrylamide, N,N-dipropylaminopropylacrylamide, N,N-butylpropylaminopropylacrylamide, N,N-dibutylaminopropylacrylamide, N,N-dimethylaminobutylacrylamide, N,N-ethylmethylaminobutylacrylamide, N,N-diethylaminobutylacrylamide, N,N-ethylpropylaminobutylacrylamide, N,N-dipropylaminobutylacrylamide, N,N-butylpropylaminobutylacrylamide, and N,N-dibutylaminobutylacrylamide, and the corresponding methacrylamides. In particular, N,N-dimethylaminopropylacrylamide is preferred because it improves the property balance.

The modified diene rubber B is a diene rubber modified with a combination of a silicon or tin compound represented by Formula (II) and a modifying compound represented by Formula (III), or a diene rubber modified with a modifying compound represented by Formula (III):

$$R_aMX_b \quad (II)$$

wherein R represents an alkyl, alkenyl, cycloalkenyl, or aromatic hydrocarbon group; M represents silicon or tin; X represents a halogen; a represents an integer of 0 to 2; and b represents an integer of 2 to 4,

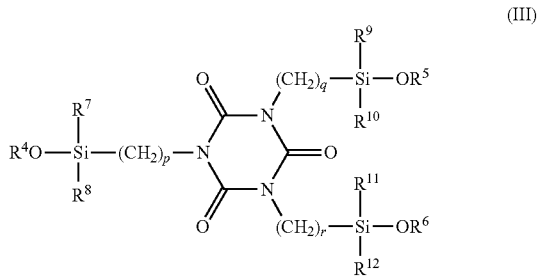

(III)

wherein $R^4$ to $R^6$ are the same as or different from one another, each representing a C1 to C8 alkyl group; $R^7$ to $R^{12}$ are the same as or different from one another, each representing a C1 to C8 alkoxy or alkyl group; and p to r are the same as or different from one another, each representing an integer of 1 to 8. The former rubber is a diene rubber whose polymer end is coupled with the silicon or tin compound and then modified with the modifying compound. The latter rubber is a diene rubber having a polymer end modified with the modifying compound.

The silicon or tin compound represented by Formula (II) functions as a coupling agent for diene rubber. Examples of the silicon compounds include tetrachlorosilicon, tetrabromosilicon, methyltrichlorosilicon, butyltrichlorosilicon, dichlorosilicon, and bistrichlorosilylsilicon. Examples of the tin compounds include tetrachlorotin, tetrabromotin, methyltrichlorotin, butyltrichlorotin, dichlorotin, and bistrichlorosilyltin.

In Formula (III), $R^4$ to $R^6$ each are preferably a methyl, ethyl, propyl or butyl group, $R^7$ to $R^{12}$ each are preferably a methoxy, ethoxy, propoxy or butoxy group, and p to r each are preferably an integer of 2 to 5. Such structures improve the property balance.

Specific examples of the modifying compound represented by Formula (III) include 1,3,5-tris(3-trimethoxysilylpropyl)isocyanurate, 1,3,5-tris(3-triethoxysilylpropyl)isocyanurate, 1,3,5-tris(3-tripropoxysilylpropyl)isocyanurate, and 1,3,5-tris(3-tributoxysilylpropyl)isocyanurate. In particular, 1,3,5-tris(3-trimethoxysilylpropyl)isocyanurate is preferred because it improves the property balance.

The modified diene rubbers A and B may, for example, be obtained by separately preparing the rubbers A and B and then blending them. In such a case, each of the modified diene rubbers A and B may be prepared as described below, for example.

The modified diene rubber A may be prepared by reacting an active alkali metal-terminated conjugated diene polymer with the acrylamide compound represented by Formula (I), wherein the active alkali metal-terminated conjugated diene polymer is obtained by polymerizing a conjugated diene monomer alone or a combination of a conjugated diene monomer and an aromatic vinyl monomer in a hydrocarbon solvent in the presence of an alkali metal catalyst.

Examples of the conjugated diene monomers include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene and isoprene are preferred among these.

Examples of the aromatic vinyl monomers include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferred among these.

The hydrocarbon solvent is not particularly limited as long as it does not deactivate an alkali metal catalyst. Examples thereof include aliphatic hydrocarbons, aromatic hydrocarbons, and alicyclic hydrocarbons. Specific examples thereof include those having 3 to 12 carbon atoms, such as propane, n-butane, iso-butane, n-pentane, iso-pentane, n-hexane, cyclohexane, benzene, toluene, and xylene.

Examples of the alkali metal catalysts include metals such as lithium, sodium, potassium, rubidium, and cesium, and hydrocarbon compounds containing these metals. Preferred alkali metal catalysts include lithium- or sodium-containing compounds having 2 to 20 carbon atoms. Specific examples thereof include ethyllithium, n-propyllithium, iso-propyllithium, n-butyllithium, sec-butyllithium, t-octyllithium, n-decyllithium, and phenyllithium.

The monomer for polymerization may be a conjugated diene monomer alone or a combination of a conjugated diene monomer and an aromatic vinyl monomer. When a conjugated diene monomer and an aromatic vinyl monomer are used in combination, the ratio of these monomers [(conjugated diene monomer)/(aromatic vinyl monomer)] is preferably 50/50 to 90/10, and more preferably 55/45 to 85/15, on a mass basis.

The polymerization may be carried out using commonly used materials such as an alkali metal catalyst, a hydrocarbon solvent, a randomizer, and an agent for controlling the vinyl bond content of conjugated diene units. The method for forming the polymer is not particularly limited.

Various Lewis basic compounds may be used for controlling the vinyl bond content of conjugated diene units. Considering the easy availability for industrial purposes, ether compounds and tertiary amines are preferred. Examples of the ether compounds include cyclic ethers such as tetrahydrofuran, tetrahydropyran, and 1,4-dioxane; aliphatic monoethers such as diethyl ether and dibutyl ether; and aliphatic diethers such as ethylene glycol dimethyl ether. Examples of the tertiary amines include triethylamine and tripropylamine.

When the acrylamide compound is added to the active alkali metal-terminated conjugated diene polymer to prepare the modified diene rubber A, the amount thereof is usually 0.05 to 10 mol, preferably 0.2 to 2 mol, per mol of the alkali metal catalyst used in the addition of the alkali metal.

Since the reaction between the acrylamide compound and the active alkali metal-terminated conjugated diene polymer rapidly proceeds, the reaction temperature and the reaction time can be selected from wide ranges. Typically, the reaction temperature ranges from room temperature to 100° C. and the reaction time ranges from few seconds to several hours. Any method can be employed for the reaction as long as the active conjugated diene polymer and the acrylamide compound are brought into contact. Examples include a method in which the diene polymer is prepared in the presence of an alkali metal catalyst, and a predetermined amount of the acrylamide compound is then added to the polymer solution.

After completion of the reaction, coagulation may be performed in the reaction solvent by a method commonly used in the production of rubber by solution polymerization, without any modification, such as the addition of a coagulant or steam coagulation. The coagulation temperature is not at all limited. The resulting modified diene rubber A has a molecular end to which the acrylamide compound has been introduced.

Meanwhile, the modified diene rubber B may be prepared by reacting an active alkali metal-terminated conjugated diene polymer with: (a) the silicon or tin compound (coupling agent) represented by Formula (II) and then the modifying compound represented by Formula (III); or (b) with the modifying compound represented by Formula (III), wherein the active alkali metal-terminated conjugated diene polymer is obtained by polymerizing a conjugated diene monomer alone or a combination of a conjugated diene monomer and an aromatic vinyl monomer in a hydrocarbon solvent in the presence of an alkali metal catalyst.

The active alkali metal-terminated conjugated diene polymer may be obtained in the same manner as in the preparation of the modified diene rubber A. In the process (a), the silicon or tin compound is usually used in the range of 0.01 to 0.4 equivalents of halogen atoms per equivalent of the terminal alkali metal atom of the active conjugated diene polymer. The coupling reaction is usually carried out at a temperature ranging from 20° C. to 100° C. The reaction of the modifying compound in the process (a) or (b) may be carried out in the same manner as in the reaction of the acrylamide compound mentioned above. The modified diene rubber B thus obtained has a molecular end to which the modifying compound has been introduced.

The modified diene rubbers A and B are preferably provided as a mixture obtained by preparing the rubbers A and B in a single batch. In such a case, for example, the mixture may be prepared by reacting the active alkali metal-terminated conjugated diene polymer with the acrylamide compound and with either a combination of the silicon or tin compound and the modifying compound or the modifying compound.

More specifically, the mixture may be prepared, for example, as follows: An active alkali metal-terminated conjugated diene polymer is prepared as described above, followed by: (c) adding to the polymer solution an acrylamide compound, then, optionally, a silicon or tin compound (coupling agent), and then a modifying compound; or d) by simultaneously adding to the polymer solution an acrylamide compound, a modifying compound, and optionally a silicon or tin compound.

In such cases, the reactions with the acrylamide compound and with the modifying compound and the coupling reaction may be carried out as mentioned above. The resulting mixture contains the modified diene rubber A having a molecular end to which the acrylamide compound has been introduced, and the modified diene rubber B having a molecular end to which the modifying compound has been introduced.

In the present invention, the blend of the modified diene rubbers A and B having as a whole a weight average molecular weight falling within a specific range may include a mixture obtained by reacting an active alkali metal-terminated conjugated diene polymer with two or more modifiers, wherein the active alkali metal-terminated conjugated diene polymer is obtained by polymerizing a conjugated diene monomer alone or a combination of a conjugated diene monomer and an aromatic vinyl monomer in a hydrocarbon solvent in the presence of an alkali metal catalyst.

In other words, though the above describes the mixture obtained by a reaction of the active conjugated diene polymer with a specific modifier, the mixture in the present invention is not limited to such embodiments and includes mixtures obtained by reaction with any two or more modifiers. These mixtures may be obtained, for example, by reacting an active alkali metal-terminated conjugated diene polymer prepared as described above with two or more conventionally known terminal modifiers in a single batch. The use of such a mixture prepared in a single batch provides the effect of improving the property balance.

The combined modified diene rubbers A and B used in the rubber composition of the present invention have a weight average molecular weight (a weight average molecular weight measured for the entire composition consisting of the modified diene rubbers A and B) of 300,000 or more, preferably 500,000 or more, and more preferably 600,000 or more. The Mw is 1,400,000 or less, preferably 1,200,000 or less, and more preferably 1,000,000 or less. With the Mw falling within the range mentioned above, the property balance can be improved.

The molecular weight distribution (Mw/Mn) of the combined modified diene rubbers A and B is preferably 4 or smaller, more preferably 3.5 or smaller, and still more preferably 3 or smaller. If the Mw/Mn is more than 4, the rubbers tend to lead to poor filler dispersibility and an increased tan δ (deterioration in rolling resistance properties).

As used herein, the number average molecular weight (Mn) and the weight average molecular weight (Mw) of the two rubbers and the aromatic vinyl polymer mentioned later are determined relative to polystyrene standards based on measurements obtained by gel permeation chromatography (GPC) (GPC-8000 series produced by TOSOH CORPORATION, detector: differential refractometer, column: TSK-GEL SUPERMALTPORE HZ-M produced by TOSOH CORPORATION).

The modified diene rubbers A and B each are preferably a modified polybutadiene rubber (modified BR) or a modified styrene butadiene rubber (modified SBR), and more preferably a modified SBR, because then the property balance can be improved.

In the case that the modified diene rubbers A and B are modified SBRs, the vinyl bond content of the butadiene units of the combined rubbers A and B is preferably 20% by mass or more, and more preferably 25% by mass or more. Modified diene rubbers having a vinyl bond content less than 20% by mass tend to be difficult to polymerize (or produce). The vinyl bond content is preferably 60% by mass or less, and more preferably 55% by mass or less. If the vinyl bond content is more than 60% by mass, filler dispersibility tends to be deteriorated. The vinyl bond content (1,2-butadiene unit content) herein can be determined by infrared absorption spectrometry.

In the case that the modified diene rubbers A and B are modified SBRs, the styrene content of the combined rubbers A and B is preferably 10% by mass or more, more preferably 15% by mass or more, and still more preferably 25% by mass or more. If the styrene content is less than 10% by mass, wet-skid performance tends to be deteriorated. The styrene content is preferably 50% by mass or less, and more preferably 45% by mass or less. If the styrene content is more than 50% by mass, abrasion resistance tends to be deteriorated. The styrene content herein is determined by $^{1}$H-NMR.

In the rubber composition of the present invention, the blending ratio of the modified diene rubbers A and B (mass ratio of A/B) is preferably 5/95 to 95/5, more preferably 10/90 to 90/10, and still more preferably 20/80 to 80/20. The ratio below the lower limit tends to result in a reduction in rolling resistance properties, while the ratio above the upper limit tends to result in a reduction in abrasion resistance. Thus, in both cases, the property balance tends to be deteriorated.

The combined amount of the modified diene rubbers A and B based on 100% by mass of the rubber component in the rubber composition is preferably 2% by mass or more, more preferably 5% by mass or more, and still more preferably 10% by mass or more. If the combined amount is less than 2% by mass, rolling resistance properties and abrasion resistance may not be sufficiently improved. The upper limit of the combined amount is not particularly limited, and may be 100% by mass. The upper limit is preferably 90% by mass or less, and more preferably 80% by mass or less.

Examples of other rubber materials that may be contained in the rubber component in the present invention include diene rubbers such as natural rubber (NR), polyisoprene rubber (IR), polybutadiene rubber (BR), styrene butadiene rubber (SBR), acrylonitrile butadiene rubber (NBR), chloroprene rubber (CR), butyl rubber (IIR), halogenated butyl rubber (X-IIR), and styrene-isoprene-butadiene copolymer rubber (SIBR). In particular, SBR and BR are preferred because they are highly compatible and contribute to a better property balance.

The SBR may be one commonly used in the tire industry, such as emulsion polymerized styrene butadiene rubber (E-SBR) and solution polymerized styrene butadiene rubber (S-SBR). Examples of BR include BR having a high cis content and BR containing syndiotactic polybutadiene crystals.

In the case that SBR (unmodified) is used, the amount of SBR is preferably 20% by mass or more, more preferably 40% by mass or more, and still more preferably 50% by mass or more. Less than 20% by mass of SBR tends to result in poor processability. The amount of SBR is preferably 90% by mass or less, more preferably 80% by mass or less, and still more preferably 70% by mass or less. More than 90% by mass of SBR tends to make it difficult to disperse silica, thus deteriorating the balance between wet-skid performance and abrasion resistance.

The suitable styrene content of SBR (unmodified) is as described in the case that the modified diene rubbers A and B are modified SBRs.

In the case that modified SBR and/or unmodified SBR are used in the present invention, the total amount of all SBRs based on 100% by mass of the rubber component is preferably 75% by mass or more, more preferably 85% by mass or more, still more preferably 95% by mass or more, and most preferably 100% by mass. If the total amount is less than 75% by mass, abrasion resistance tends to be lowered.

In the case that BR (unmodified) is used, the amount of BR is preferably 5% by mass or more, and more preferably 10% by mass or more. Less than 5% by mass of BR tends to result in poor abrasion resistance. The amount of BR is preferably 40% by mass or less, and more preferably 30% by mass or less. More than 40% by mass of BR tends to result in reduced wet-skid performance.

In the present invention, silica having a CTAB specific surface area of 180 $m^2/g$ or more and a BET specific surface area of 185 $m^2/g$ or more (hereafter, also referred to as "fine particle silica") is used. The use of such fine particle silica dispersed well in rubber provides excellent abrasion resistance and wet-skid performance and also lowers rolling resistance.

The fine particle silica preferably has a CTAB (cetyltrimethylammonium bromide) specific surface area of 190 $m^2/g$ or more, more preferably 195 $m^2/g$ or more, and still more preferably 197 $m^2/g$ or more. If the CTAB specific surface area is less than 180 $m^2/g$, mechanical strength and abrasion resistance tend not to improve sufficiently. The CTAB specific surface area is preferably 600 $m^2/g$ or less, more preferably 300 $m^2/g$ or less, and still more preferably 250 $m^2/g$ or less. If the CTAB specific surface area is more than 600 $m^2/g$, such fine particle silica tends to have poor dispersibility and thus agglomerate, lowering the physical properties.

The CTAB specific surface area is measured in conformity with ASTM D3765-92.

The fine particle silica preferably has a BET specific surface area of 190 $m^2/g$ or more, more preferably 195 $m^2/g$ or more, and still more preferably 210 $m^2/g$ or more. If the BET specific surface area is less than 185 $m^2/g$, mechanical strength and abrasion resistance are less likely to improve sufficiently. The BET specific surface area is preferably 600 $m^2/g$ or less, more preferably 300 $m^2/g$ or less, and still more preferably 260 $m^2/g$ or less. If the BET specific surface area is more than 600 $m^2/g$, such fine particle silica tends to have poor dispersibility and thus agglomerate, lowering the physical properties.

The BET specific surface area of silica is measured in conformity with ASTM D3037-81.

The fine particle silica has an aggregate size of 30 nm or more, preferably 35 nm or more, more preferably 40 nm or more, still more preferably 45 nm or more, particularly preferably 50 nm or more, most preferably 55 nm or more, and still most preferably 60 nm or more. The aggregate size is also preferably 100 nm or less, more preferably 80 nm or less, still more preferably 70 nm or less, and particularly preferably 65 nm or less. Those having such an aggregate size can disperse well and provide excellent reinforcement and abrasion resistance.

The aggregate size of fine particle silica can be measured by a method disclosed in JP-A 2011-140613.

The fine particle silica preferably has an average primary particle size of 25 nm or less, more preferably 22 nm or less, still more preferably 17 nm or less, and particularly preferably 14 nm or less. The lower limit of the average primary particle size is not particularly limited, and is preferably 3 nm or more, more preferably 5 nm or more, and still more preferably 7 nm or more. Since the silica, although having such a small average primary particle size, has a structure similar to that of carbon black with the aggregate size described above, the silica has further improved dispersibility and thus reinforcement and abrasion resistance can be further improved.

The average primary particle size of fine particle silica can be determined by observing primary particles of the silica by transmission or scanning electron microscopy and averaging measurements of at least 400 primary particles in the visual field.

The fine particle silica preferably has a D50 of 7.0 μm or less, more preferably 5.5 μm or less, and still more preferably 4.5 μm or less. If the D50 is more than 7.0 μm, it is indicated that the silica ends up having poor dispersibility. The fine particle silica preferably has a D50 of 2.0 μm or more, more preferably 2.5 μm or more, and still more preferably 3.0 μm or more. If the D50 is less than 2.0 μm, the aggregate size also tends to become smaller and thus the fine particle silica is less likely to have sufficient dispersibility.

The D50 means the median diameter of fine particle silica than which 50% by volume of the particles thereof are smaller.

The proportion of particles with a particle size exceeding 18 μm in the fine particle silica is preferably 6% by mass or less, more preferably 4% by mass or less, and still more preferably 1.5% by mass or less. Within such a range, the silica has good dispersibility and provides desired properties.

The D50 of fine particle silica and the proportion of silica particles with a predetermined particle size are determined by a method disclosed in JP-A 2011-140613.

The distribution width W of the pore volume of the fine particle silica is preferably 0.7 or more, more preferably 1.0 or more, still more preferably 1.3 or more, and particularly preferably 1.5 or more. The distribution width W is also preferably 5.0 or less, more preferably 4.0 or less, still more preferably 3.0 or less, and particularly preferably 2.0 or less. Such a broad pore distribution enables the silica to have improved dispersibility and thus to provide desired properties.

The distribution width W of the pore volume of silica can be measured by a method disclosed in JP-A 2011-140613.

The diameter Xs (nm) that gives the peak value Ys of the pore volume in the pore distribution curve of the fine particle silica is preferably 10 nm or more, more preferably 15 nm or more, still more preferably 18 nm or more, and particularly preferably 20 nm or more, whereas it is preferably 60 nm or less, more preferably 35 nm or less, still more preferably 28 nm or less, and particularly preferably 25 nm or less. The fine particle silica falling within the range mentioned above has excellent dispersibility and reinforceability.

In the rubber composition of the present invention, the amount of the fine particle silica added per 100 parts by mass of the rubber component is preferably 5 parts by mass or more, more preferably 10 parts by mass or more, still more preferably 15 parts by mass or more, and particularly preferably 20 parts by mass or more. If the amount is less than 5 parts by mass, reinforcement, mechanical strength, and abrasion resistance tend to be insufficient. The amount of the fine particle silica added is preferably 150 parts by mass or less, more preferably 100 parts by mass or less, and still more preferably 80 parts by mass or less. If the amount is more than 150 parts by mass, processability is deteriorated and, at the same time, good dispersibility is less likely to be ensured.

The rubber composition of the present invention may contain silica other than the fine particle silica. In this case, the total amount of silica per 100 parts by mass of the rubber component is preferably 15 parts by mass or more, more preferably 25 parts by mass or more, and still more preferably 45 parts by mass or more. The total amount is preferably 200 parts by mass or less, more preferably 150 parts by mass or less, and still more preferably 100 parts by mass or less. If the total amount is less than the lower limit or is more than the upper limit, the same tendencies as mentioned above for the amount of the fine particle silica can be observed.

In the present invention, a silane coupling agent may be used in combination with silica. Examples of the silane coupling agents include bis(3-triethoxysilylpropyl)tetrasulfide, bis(3-triethoxysilylpropyl)trisulfide, and bis(3-triethoxysilylpropyl)disulfide. Preferred among these is bis(3-triethoxysilylpropyl)tetrasulfide because it highly improves reinforcement.

The amount of silane coupling agent per 100 parts by mass of silica is preferably 1 part by mass or more and more preferably 2 parts by mass or more. If the amount is less than 1 part by mass, the coupling effect tends not to be enough to provide sufficient wet-skid performance; in addition, abrasion resistance tends to be lowered. The amount of silane coupling agent is preferably 20 parts by mass or less, and more preferably 15 parts by mass or less. If the amount is more than 20 parts by mass, the rubber composition tends to become harder, lowering wet-skid performance.

The rubber composition of the present invention preferably contains carbon black as filler, in addition to silica. In the present invention, since the modified diene rubbers A and B are used as the rubber component, the dispersibility of fillers, such as silica and carbon black, is significantly improved, so that the property balance can be synergistically improved.

The use of carbon black increases reinforcement and further improves abrasion resistance. The carbon black is not particularly limited, and examples thereof include GPF, FEF, HAF, ISAF, and SAF. Each carbon black may be used alone, or two or more thereof may be used in combination.

The nitrogen adsorption specific surface area ($N_2SA$) of carbon black is preferably 50 $m^2/g$ or greater, and more preferably 100 $m^2/g$ or greater. Carbon black having a $N_2SA$ smaller than 50 $m^2/g$ tends not to provide sufficient reinforcement. The $N_2SA$ of carbon black is preferably 200 $m^2/g$ or smaller, and more preferably 150 $m^2/g$ or smaller. Carbon black having a $N_2SA$ greater than 200 $m^2/g$ is difficult to disperse and therefore tends to result in deterioration in rolling resistance properties.

Here, the nitrogen adsorption specific surface area of carbon black is determined in accordance with JIS K6217-2:2001.

The dibutyl phthalate (DBP) oil absorption of carbon black is preferably 60 ml/100 g or more, and more preferably 100 ml/100 g or more. Carbon black having a DBP oil absorption less than 60 ml/100 g may not provide sufficient reinforcement. The DBP oil absorption of carbon black is preferably 150 ml/100 g or less, and more preferably 120 ml/100 g or less. Carbon black having a DBP oil absorption more than 150 ml/100 g tends to have lower processability and dispersibility.

Here, the DBP oil absorption of carbon black is determined in conformity with JIS K6217-4: 2001.

The amount of carbon black per 100 parts by mass of the rubber component is preferably 10 parts by mass or more, more preferably 20 parts by mass or more, and still more preferably 30 parts by mass or more. Less than 10 parts by mass of carbon black tends not to provide sufficient reinforcement. The amount of carbon black is preferably 100 parts by mass or less, more preferably 80 parts by mass or less, and still more preferably 60 parts by mass or less. More than 100 parts by mass of carbon black is difficult to disperse and therefore tends to result in deterioration in rolling resistance properties.

In the rubber composition of the present invention, the combined amount of carbon black and silica per 100 parts by mass of the rubber component is preferably 40 parts by mass or more, and more preferably 70 parts by mass or more. A combined amount less than 40 parts by mass tends not to provide sufficient reinforcement. The combined amount is preferably 150 parts by mass or less, and more preferably 110 parts by mass or less. A combined amount more than 150 parts by mass tends to result in lower filler dispersibility.

When both fillers, carbon black and silica, are used, the ratio of silica to combined carbon black and silica is preferably 45% by mass or more, and more preferably 50% by mass or more, whereas it is preferably 90% by mass or less, and more preferably 80% by mass or less. The ratio falling within the range mentioned above allows the effects of the invention to be sufficiently exerted.

In the present invention, sulfur (cross-linking agent) is usually used.

The sulfur may be, for example, powdered sulfur, precipitated sulfur, colloidal sulfur, insoluble sulfur, or highly dispersible sulfur.

The amount of sulfur per 100 parts by mass of the rubber component is preferably 0.1 parts by mass or more, more preferably 0.2 parts by mass or more, and still more preferably 0.3 parts by mass or more. If the amount of sulfur is less than 0.1 parts by mass, cure rate may be decreased, deteriorating productivity. The amount of sulfur is preferably 2.0 parts by mass or less, more preferably 1.9 parts by mass or less, and still more preferably 1.8 parts by mass or less. If the amount of sulfur is more than 2.0 parts by mass, rubber physical properties may greatly change after aging.

The rubber composition of the present invention may appropriately contain, in addition to the above components, additives such as a softener (e.g. oil), an antioxidant, a vulcanization accelerator, and a vulcanization accelerator aid, as necessary.

The rubber composition of the present invention can be used for tire components such as treads, sidewalls, and innerliners. In particular, the rubber composition can be suitably used for treads because it ensures both abrasion resistance and wet-skid performance. Moreover, tires including the rubber composition can be suitably used for passenger cars, commercial vehicles, two-wheel vehicles, and the like.

The rubber composition of the present invention can be prepared by a commonly used method, such as by kneading the components described above in a Banbury mixer, kneader, open roll mill, or the like machine, followed by vulcanization. The rubber composition is preferably prepared by a method including Step 1 of mixing a rubber component, a filler (reinforcing agent), a silane coupling agent, and a softener; Step 2 of mixing a mixture obtained in Step 1 with stearic acid, zinc oxide, and an antioxidant; and Step 3 of mixing a mixture obtained in Step 2 with a vulcanizing agent and a vulcanization accelerator. In general, the kneading process is not divided into Steps 1 and 2 but is carried out as a single step. In the present invention, however, since chemicals such as an antioxidant, zinc oxide, and stearic acid reduce the reactivity of a silane coupling agent, these components and optionally wax are preferably kneaded in Step 2.

In such a preparation method including Steps 1 to 3, the kneading temperature is preferably 130° C. to 160° C. in Step 1, 130° C. to 155° C. in Step 2, and 70° C. to 120° C. in Step 3. If the kneading temperature in each step exceeds the corresponding upper limit, the rubber tends to be degraded.

The pneumatic tire of the present invention may be prepared by a conventional method using the rubber composition. Specifically, the rubber composition containing the aforementioned components in the unvulcanized state is extruded into the shape of a tire component (e.g. tread), and then assembled with other tire components on a tire building machine in a usual manner to build an unvulcanized tire. The unvulcanized tire is heated and pressurized in a vulcanizing machine to provide a pneumatic tire.

EXAMPLES

The present invention is described more specifically by reference to, but not limited to, examples.

The chemicals used in the examples and comparative examples are listed below.

Modified diene rubbers A and B: Preparation Examples 1 to 10 (Oil content in each rubber: 15% by mass) mentioned below SBR: SBR1502 (styrene content: 23.5% by mass), a product of JSR Corporation BR: BR130B, a product of Ube Industries, Ltd.

Silica 1: Zeosil 1115 MP (CTAB specific surface area: 105 m$^2$/g, BET specific surface area: 115 m$^2$/g, average primary particle size: 25 nm, aggregate size: 92 nm, pore distribution width W: 0.63, diameter Xs that gives the peak value of the pore volume in the pore distribution curve: 60.3 nm), a product of Rhodia Silica 2: Zeosil HRS 1200 MP (CTAB specific surface area: 195 m$^2$/g, BET specific surface area: 200 m$^2$/g, average primary particle size: 15 nm, aggregate size: 40 nm, D50: 6.5 μm, proportion of particles with a particle size exceeding 18 μm: 5.0% by mass, pore distribution width W: 0.40, diameter Xs that gives the peak value of the pore volume in the pore distribution curve: 18.8 nm), a product of Rhodia Silica 3: Zeosil Premium 200 MP (CTAB specific surface area: 200 m$^2$/g, BET specific surface area: 220 m$^2$/g, average primary particle size: 10 nm, aggregate size: 65 nm, D50: 4.2 μm, proportion of particles with a particle size exceeding 18 μm: 1.0% by mass, pore distribution width W: 1.57, diameter Xs that gives the peak value of the pore volume in the pore distribution curve: 21.9 nm), a product of Rhodia Carbon black: Diablack I (N$_2$SA: 114 m$^2$/g, DBP oil absorption: 114 mL/100 g), a product of Mitsubishi Chemical Corporation Silane coupling agent: Si69 (bis(3-triethoxysilylpropyl) tetrasulfide), a product of EVONIK-DEGUSSA Oil: JOMO Process X140, a product of JX Nippon Oil & Energy Corporation Wax: SUNNOC N, a product of Ouchi Shinko Chemical Industrial Co., Ltd.

Antioxidant: NOCRAC 6C (N-(1,3-dimethylbutyl)-N'-phenyl-p-phenylenediamine), a product of Ouchi Shinko Chemical Industrial Co., Ltd.

Stearic acid: TSUBAKI, a product of NOF Corporation

Zinc oxide: Zinc oxide #1, a product of Mitsui Mining & Smelting Co., Ltd.

Sulfur: Seimi sulfur (insoluble sulfur with a carbon disulfide-insoluble content of 60% and an oil content of 10% by mass), a product of Nippon Kanryu Industry Co., Ltd.

Vulcanization accelerator TBBS: NOCCELER NS, a product of Ouchi Shinko Chemical Industrial Co., Ltd.

Vulcanization accelerator DPG: NOCCELER D, a product of Ouchi Shinko Chemical Industrial Co., Ltd.

Preparation Example 1

A stainless steel polymerization reactor having an inner volume of 20 L was cleaned and dried, and the air therein was replaced with dry nitrogen. To the reactor were then added 1,3-butadiene (548 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, N,N-dimethylaminopropylacrylamide (1.57 mmol, 0.245 g) and 1,3,5-tris(3-trimethoxysilylpropyl)isocyanurate (3.66 mmol, 2.251 g) were added thereto. After the reaction was allowed to proceed with stirring for 30 minutes, methanol (10 ml) was added and the mixture was further stirred for five minutes. Then, the contents were taken out from the polymerization reactor, and 2,6-di-t-butyl-p-cresol (10 g, SUMILIZER BHT produced by Sumitomo Chemical CO., Ltd., the same shall apply hereinafter) and oil (141 g) were added thereto. Most of the hexane was distilled out and the residue was dried under reduced pressure at 55° C. for 12 hours to give a rubber mixture 1.

Preparation Example 2

A rubber mixture 2 was prepared in the same manner as in Preparation Example 1, except that the amount of N,N-dimethylaminopropylacrylamide was changed to 0.52 mmol (0.082 g) and the amount of 1,3,5-tris(3-trimethoxysilylpropyl)isocyanurate was changed to 4.70 mmol (2.894 g).

Preparation Example 3

A rubber mixture 3 was prepared in the same manner as in Preparation Example 1, except that the amount of N,N-dimethylaminopropylacrylamide was changed to 4.70 mmol (0.734 g) and the amount of 1,3,5-tris(3-trimethoxysilylpropyl)isocyanurate was changed to 0.52 mmol (0.322 g).

Preparation Example 4

A rubber mixture 4 was prepared in the same manner as in Preparation Example 1, except that the amount of tetrahydrofuran was changed to 31.12 g; the amount of n-butyllithium (in n-hexane) was changed to 18.28 mmol; the amount of N,N-dimethylaminopropylacrylamide was changed to 1.83 mmol (0.286 g); and the amount of 1,3,5-tris(3-trimethoxysilylpropyl)isocyanurate was changed to 16.45 mmol (10.131 g).

Preparation Example 5

A rubber mixture 5 was prepared in the same manner as in Preparation Example 1, except that the amount of tetrahydrofuran was changed to 31.12 g; the amount of n-butyllithium (in n-hexane) was changed to 18.28 mmol; the amount of N,N-dimethylaminopropylacrylamide was changed to 16.45 mmol (2.57 g); and the amount of 1,3,5-tris(3-trimethoxysilylpropyl)isocyanurate was changed to 1.83 mmol (1.126 g).

Preparation Example 6

A rubber mixture 6 was prepared in the same manner as in Preparation Example 1, except that the amount of tetrahydrofuran was changed to 4.15 g; the amount of n-butyllithium (in n-hexane) was changed to 2.44 mmol; the amount of N,N-dimethylaminopropylacrylamide was changed to 0.24 mmol (0.038 g); and the amount of 1,3,5-tris(3-trimethoxysilylpropyl)isocyanurate was changed to 2.19 mmol (1.351 g).

Preparation Example 7

A rubber mixture 7 was prepared in the same manner as in Preparation Example 1, except that the amount of tetrahydrofuran was changed to 4.15 g; the amount of n-butyllithium (in n-hexane) was changed to 2.44 mmol; the amount of N,N-dimethylaminopropylacrylamide was changed to 2.19 mmol (0.343 g); and the amount of 1,3,5-tris(3-trimethoxysilylpropyl)isocyanurate was changed to 0.24 mmol (0.15 g).

Preparation Example 8

A rubber mixture 8 was prepared in the same manner as in Preparation Example 1, except that the amount of tetrahydrofuran was changed to 4.15 g, the amount of n-butyllithium (in n-hexane) was changed to 2.44 mmol; the amount of N,N-dimethylaminopropylacrylamide was changed to 0 mmol (0 g); and the amount of 1,3,5-tris(3-trimethoxysilylpropyl)isocyanurate was changed to 2.44 mmol (1.501 g).

Preparation Example 9

A rubber mixture 9 was prepared in the same manner as in Preparation Example 1, except that the amount of tetrahydrofuran was changed to 4.15 g; the amount of n-butyllithium (in n-hexane) was changed to 2.44 mmol; the amount of N,N-dimethylaminopropylacrylamide was changed to 2.44 mmol (0.381 g); and the amount of 1,3,5-tris(3-trimethoxysilylpropyl)isocyanurate was changed to 0 mmol (0 g).

Preparation Example 10

A stainless steel polymerization reactor having an inner volume of 20 L was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, N,N-dimethylaminopropylacrylamide (5.22 mmol, 0.816 g) was added thereto. After the reaction was allowed to proceed with stirring for 30 minutes, methanol (10 ml) was added and the mixture was further stirred for five minutes (modified diene rubber A).

Separately, a stainless steel polymerization reactor having an inner volume of 20 L was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, a solution in n-hexane). The mixture was subjected to polymerization with stirring at 65° C. for three hours. After completion of the polymerization, 1,3,5-tris(3-trimethoxysilylpropyl)isocyanurate (5.22 mmol, 3.216 g) was added thereto. After the reaction was allowed to proceed with stirring for 30 minutes, methanol (10 ml) was added and the mixture was further stirred for five minutes (modified diene rubber B).

Then, the contents were taken out from the respective polymerization reactors and mixed with each other so that the blending ratio of the modified diene rubbers A and B (mass ratio of A/B) was 30/70. Thereto were added 2,6-di-t-butyl-p-cresol (10 g) and oil (141 g). Most of the hexane was distilled out and the residue was dried under reduced pressure at 55° C. for 12 hours to give a rubber mixture 10.

Examples and Comparative Examples

In accordance with each formulation shown in Tables 1 and 2 (the amount of sulfur means the amount of net sulfur in Seimi sulfur), first the materials listed in the column "Step 1" were kneaded at 150° C. for three minutes in a 1.7-L Banbury mixer to give a kneaded mixture. Subsequently, the materials listed in the column "Step 2" were added to the kneaded mixture obtained in Step 1, and they were kneaded at 140° C. for three minutes to give a kneaded mixture. Thereafter, the materials listed in the column "Step 3" were added to the kneaded mixture obtained in Step 2, and they were kneaded in an open roll mill for three minutes at 80° C. to provide an unvulcanized rubber composition. The unvulcanized rubber composition was press-vulcanized at 150° C. for 20 minutes to provide a vulcanized rubber sheet.

Separately, the unvulcanized rubber composition was formed into the shape of a tread having a thickness of 10 mm, and then assembled with other tire components and vulcanized at 170° C. for 15 minutes to prepare a test tire (tire size: 215/45ZR17).

The obtained vulcanized rubber sheets and test tires were subjected to the following evaluations. The test results are shown in Tables 1 and 2.

(Rolling Resistance Index)

By using the vulcanized rubber sheets, the tan δ of each formulation was measured with a viscoelastic spectrometer VES (Iwamoto Seisakusho Co., Ltd.) at 70° C., an initial strain of 10%, and a dynamic strain of 2% and expressed as an index relative to the tan δ of Comparative Example 1 (=100), according to the equation below. The higher the index, the smaller the rolling resistance, and the better the fuel economy.

(Rolling resistance index)=(tan δ of Comparative Example 1)/ (tan δ of each formulation)×100

(Wet-Skid Performance)

The test tire was mounted on each wheel of a car (2000-cc front-engine, front-wheel-drive car produced in Japan). The braking distance from an initial speed of 100 km/h was measured on a wet asphalt road. The braking distance of each formulation is expressed as an index relative to the braking distance of Comparative Example 1 (=100), according to the equation below. The higher the index, the better the wet-skid performance.

(Wet-skid performance)=(Braking distance of Comparative Example 1)/(Braking distance of each formulation)×100

(Abrasion Resistance)

The test tire was mounted on each wheel of a car (2000-cc front-engine, front-wheel-drive car produced in Japan), and the car was driven on a test course. The change in pattern groove depth from before to after 3000 km of driving was measured and expressed as an index relative to the change in groove depth of Comparative Example 1 (=100), according to the equation below. The higher the index, the better the abrasion resistance.

(Abrasion resistance)=(Change in groove depth of Comparative Example 1)/(Change in groove depth of each formulation)×100

TABLE 1

| | | | Example 1 | Example 2 | Example 3 | Example 4 | Example 5 | Example 6 | Example 7 |
|---|---|---|---|---|---|---|---|---|---|
| Formulation (parts by mass) | Step 1 | Modified diene rubbers A and B | 23.6 | 70.8 | 118 | 23.6 | 23.6 | 23.6 | 70.8 |
| | | SBR | 60 | 20 | — | 60 | 60 | 60 | 20 |
| | | BR | 20 | 20 | — | 20 | 20 | 20 | 20 |
| | | Silica 1 (CTAB 105 m$^2$/g, BET 115 m$^2$/g) | — | — | — | — | — | — | — |
| | | Silica 2 (CTAB 195 m$^2$/g, BET 200 m$^2$/g) | 50 | 50 | 50 | 50 | 50 | 50 | — |
| | | Silica 3 (CTAB 200 m$^2$/g, BET 220 m$^2$/g) | — | — | — | — | — | — | 50 |
| | | Carbon black | 40 | 40 | 40 | 40 | 40 | 40 | 40 |
| | | Silane coupling agent | 4 | 4 | 4 | 4 | 4 | 4 | 4 |
| | | Oil | 26.4 | 19.2 | 12 | 26.4 | 26.4 | 26.4 | 19.2 |
| | Step 2 | Wax | 2 | 2 | 2 | 2 | 2 | 2 | 2 |
| | | Antioxidant | 2 | 2 | 2 | 2 | 2 | 2 | 2 |
| | | Stearic acid | 2 | 2 | 2 | 2 | 2 | 2 | 2 |
| | | Zinc oxide | 3 | 3 | 3 | 3 | 3 | 3 | 3 |
| | Step 3 | Sulfur | 1.8 | 1.8 | 1.8 | 1.8 | 1.8 | 1.8 | 1.8 |
| | | Vulcanization accelerator TBBS | 2 | 2 | 2 | 2 | 2 | 2 | 2 |
| | | Vulcanization accelerator DPG | 1.5 | 1.5 | 1.5 | 1.5 | 1.5 | 1.5 | 1.5 |

| | Rubber mixture | Preparation Example 1 | Preparation Example 1 | Preparation Example 1 | Preparation Example 2 | Preparation Example 3 | Preparation Example 10 | Preparation Example 1 |
|---|---|---|---|---|---|---|---|---|
| Contents of modified diene rubbers A and B | Styrene content (% by mass) | 30 | 30 | 30 | 30 | 30 | 30 | 30 |
| | Vinyl bond content (% by mass) | 35 | 35 | 35 | 35 | 35 | 35 | 35 |
| | Ratio of modified diene rubber A | 30 | 30 | 30 | 10 | 90 | 30 | 30 |
| | Ratio of modified diene rubber B | 70 | 70 | 70 | 90 | 10 | 70 | 70 |
| | Weight average molecular weight (million) | 0.7 | 0.7 | 0.7 | 0.7 | 0.7 | 0.7 | 0.7 |
| Evaluation | Wet-skid performance | 110 | 120 | 130 | 105 | 110 | 110 | 120 |
| | Abrasion resistance index | 118 | 125 | 120 | 120 | 115 | 118 | 135 |
| | Rolling resistance index | 113 | 115 | 110 | 110 | 115 | 113 | 115 |

TABLE 2

| Formulation (parts by mass) | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|---|
| Step 1 | Modified diene rubbers A and B | | — | 23.6 | 70.8 | 118 | | | | | | | | 23.6 | — |
| | SBR | | 80 | 60 | 20 | — | 60 | 60 | 60 | 60 | 60 | 60 | 60 | 60 | 80 |
| | BR | | 20 | 20 | 20 | — | 20 | 20 | 20 | 20 | 20 | 20 | 20 | 20 | 20 |
| | Silica 1 (CTAB 105 m²/g, BET 115 m²/g) | | 50 | 50 | 50 | 50 | 50 | 50 | 50 | 50 | 50 | 50 | — | — | — |
| | Silica 2 (CTAB 195 m²/g, BET 200 m²/g) | | — | — | — | — | — | — | — | — | — | — | 100 | — | 50 |
| | Silica 3 (CTAB 200 m²/g, BET 220 m²/g) | | — | — | — | — | — | — | — | — | — | — | — | — | — |
| | Carbon black | | 40 | 40 | 40 | 40 | 40 | 40 | 40 | 40 | 40 | 40 | 40 | 40 | 40 |
| | Silane coupling agent | | 4 | 4 | 4 | 4 | 4 | 4 | 4 | 4 | 4 | 4 | 4 | 4 | 4 |
| | Oil | | 30 | 26.4 | 19.2 | 12 | 26.4 | 26.4 | 26.4 | 26.4 | 26.4 | 26.4 | 26.4 | 26.4 | 30 |
| Step 2 | Wax | | 2 | 2 | 2 | 2 | 2 | 2 | 2 | 2 | 2 | 2 | 2 | 2 | 2 |
| | Antioxidant | | 2 | 2 | 2 | 2 | 2 | 2 | 2 | 2 | 2 | 2 | 2 | 2 | 2 |
| | Stearic acid | | 2 | 2 | 2 | 2 | 2 | 2 | 2 | 2 | 2 | 2 | 2 | 2 | 2 |
| | Zinc oxide | | 3 | 3 | 3 | 3 | 3 | 3 | 3 | 3 | 3 | 3 | 3 | 3 | 3 |
| Step 3 | Sulfur | | 1.8 | 1.8 | 1.8 | 1.8 | 1.8 | 1.8 | 1.8 | 1.8 | 1.8 | 1.8 | 1.8 | 1.8 | 1.8 |
| | Vulcanization accelerator TBBS | | 2 | 2 | 2 | 2 | 2 | 2 | 2 | 2 | 2 | 2 | 2 | 2 | 2 |
| | Vulcanization accelerator DPG | | 1.5 | 1.5 | 1.5 | 1.5 | 1.5 | 1.5 | 1.5 | 1.5 | 1.5 | 1.5 | 1.5 | 1.5 | 1.5 |

| | Rubber Mixture | Preparation Example 1 | Preparation Example 2 | Preparation Example 3 | Preparation Example 4 | Preparation Example 5 | Preparation Example 6 | Preparation Example 7 | Preparation Example 8 | Preparation Example 9 |
|---|---|---|---|---|---|---|---|---|---|---|
| Contents of modified diene rubbers A and B | Styrene content (% by mass) | 30 | 30 | 30 | 30 | 30 | 30 | 30 | 30 | 30 |
| | Vinyl bond content (% by mass) | 35 | 35 | 35 | 35 | 35 | 35 | 35 | 35 | 35 |
| | Ratio of modified diene rubber A | 30 | 30 | 30 | 10 | 90 | 10 | 90 | 10 | — |
| | Ratio of modified diene rubber B | 70 | 70 | 70 | 90 | 10 | 90 | 10 | 100 | 100 |
| | Weight average molecular weight (million) | 0.7 | 0.7 | 0.7 | 0.7 | 1.5 | 0.2 | 0.2 | 0.7 | 0.7 |
| Evaluation | Wet-skid performance | 109 | 120 | 130 | 105 | 109 | 105 | 109 | 109 | 109 |
| | Abrasion resistance index | 103 | 115 | 110 | 110 | 99 | 95 | 98 | 110 | 98 |
| | Rolling resistance index | 108 | 109 | 105 | 105 | 108 | 113 | 108 | 113 | 110 |

In the examples in which a blend of the modified diene rubbers A and B and fine particle silica were used in combination, the property balance among rolling resistance, abrasion resistance, and wet-skid performance was synergistically improved in comparison with Comparative Example 1 in which the above-mentioned components were not used together. In Comparative Examples 2 to 12 in which the blend was used but no fine particle silica was used, an improvement in the properties was observed but was not as great as in the examples.

The invention claimed is:

1. A rubber composition for tires, comprising a diene rubber A modified with an acrylamide compound represented by Formula (I):

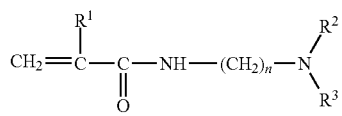

wherein $R^1$ represents hydrogen or a methyl group; $R^2$ and $R^3$ each represent a C1 to C4 alkyl group; and n represents an integer of 3 to 5, and a diene rubber B provided with a silicon compound as a coupling agent, which is tetrachlorosilicon, tetrabromosilicon, methyltrichlorosilicon, butyltrichlorosilicon, dichlorosilicon, or bistrichlorosilylsilicon, and a modifying compound represented by Formula (III) or with a modifying compound represented by Formula (III):

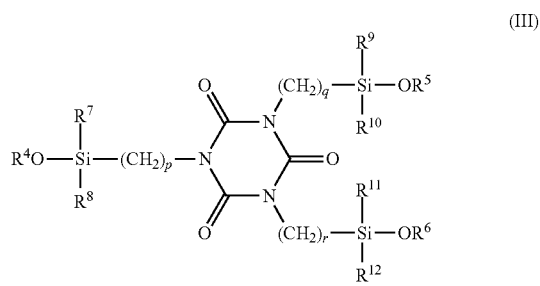

wherein $R^4$ to $R^6$ are the same as one another, each representing a methyl, ethyl, propyl, or butyl group; $R^7$ to $R^{12}$ are the same as one another, each representing a methoxy, ethoxy, propoxy or butoxy group; and p to r are the same as one another, each representing an integer of 3 to 5, wherein a polymer end of the diene rubber B is modified with the modifying compound represented by Formula (III), the combined modified diene rubbers A and B having a weight average molecular weight of 500,000 to 1,200,000, the blending ratio of the modified diene rubbers A and B (mass ratio of A/B) is 10/90 to 90/10, the modified diene rubbers A and B each are a modified styrene butadiene rubber, and the rubber composition further comprising silica having a CTAB specific surface area of 180 $m^2/g$ or more and a BET specific surface area of 185 $m^2/g$ or more.

2. The rubber composition for tires of claim 1, wherein the diene rubber B is modified with the modifying compound represented by Formula (III).

3. The rubber composition for tires of claim 1, wherein the coupling agent is tetrachlorosilicon.

4. The rubber composition for tires of claim 1, wherein the tires exhibit a wet-skid performance of 105-130, an abrasion index of 115 to 135 and a rolling resistance index of 110 to 115.

5. A pneumatic tire, comprising
a tread formed from the rubber composition according to claim 1.

* * * * *